(12) United States Patent
Moore et al.

(10) Patent No.: US 12,321,776 B2
(45) Date of Patent: Jun. 3, 2025

(54) SWITCHING BETWEEN POLLING-MODE AND INTERRUPTION-DRIVEN MODES WITHOUT LOSS OF I/O REPLIES

(71) Applicant: INTERNATIONAL BUSINESS MACHINES CORPORATION, Armonk, NY (US)

(72) Inventors: Richard John Moore, Waterlooville (GB); Damian Osisek, Vestal, NY (US)

(73) Assignee: International Business Machines Corporation, Armonk, NY (US)

(*) Notice: Subject to any disclaimer, the term of this patent is extended or adjusted under 35 U.S.C. 154(b) by 599 days.

(21) Appl. No.: 17/804,860

(22) Filed: Jun. 1, 2022

(65) Prior Publication Data

US 2023/0393886 A1 Dec. 7, 2023

(51) Int. Cl.
*G06F 9/48* (2006.01)
*G06F 9/50* (2006.01)

(52) U.S. Cl.
CPC .......... *G06F 9/4831* (2013.01); *G06F 9/5038* (2013.01)

(58) Field of Classification Search
None
See application file for complete search history.

(56) References Cited

U.S. PATENT DOCUMENTS

| | | | | |
|---|---|---|---|---|
| 5,371,884 A * | 12/1994 | Ross | ...................... | G06F 9/4812 714/10 |
| 5,414,858 A * | 5/1995 | Hoffman | ................. | G06F 13/24 710/48 |
| 2011/0023040 A1 * | 1/2011 | Hendry | ................. | G06F 9/4812 712/34 |
| 2012/0005300 A1 * | 1/2012 | Muppalla | ................ | G06F 13/24 709/212 |
| 2012/0254484 A1 | 10/2012 | Yang | | |
| 2014/0115603 A1 * | 4/2014 | Yu | ....................... | H04L 47/2441 718/105 |
| 2014/0320423 A1 * | 10/2014 | Kambhatla | ............. | G06F 3/038 345/173 |
| 2015/0347784 A1 * | 12/2015 | Keen | ....................... | H04L 67/12 726/28 |
| 2016/0158941 A1 * | 6/2016 | Hung | ................... | G05D 1/0242 901/1 |
| 2016/0188344 A1 * | 6/2016 | Tamir | .................... | G06F 9/5038 712/244 |
| 2016/0335083 A1 * | 11/2016 | Miwa | ................ | G06F 15/17331 |
| 2017/0103031 A1 * | 4/2017 | Liu | ......................... | G06F 13/22 |
| 2020/0089527 A1 | 3/2020 | Gavrilov | | |

(Continued)

OTHER PUBLICATIONS

Disclosed Anonymously, "Workload Based Message Retrieval," IP.com, Jun. 23, 2021, 6 pages, IP.com No. IPCOM000266206D, Retrieved from the Internet: <URL: https://priorart.ip.com/IPCOM/000266206>.

*Primary Examiner* — Adam Lee
(74) *Attorney, Agent, or Firm* — Teddi E. Maranzano (57) ABSTRACT

A method, computer program product, and computer system are provided for supporting lossless transitions between interruption and polling mode of a resource. In response to a state variable setting or a timed trigger, launching a task to process replies for a resource. The task processes each ready reply for each resource. A timed trigger is established to relaunch the task based on the task executing in polling mode. The task is exited.

20 Claims, 3 Drawing Sheets

(56) References Cited

U.S. PATENT DOCUMENTS

| | | | | |
|---|---|---|---|---|
| 2020/0112500 A1* | 4/2020 | Wang | ............... | H04L 43/0817 |
| 2020/0218676 A1* | 7/2020 | Cao | ............... | G06F 9/5027 |
| 2020/0326883 A1* | 10/2020 | Zhou | ............... | G06F 3/0604 |
| 2022/0253242 A1* | 8/2022 | Cresci | ............... | G06F 3/0656 |
| 2022/0253320 A1* | 8/2022 | Satdarov | ............... | G06F 16/958 |
| 2022/0414035 A1* | 12/2022 | Bai | ............... | G06F 3/061 |

* cited by examiner

SWITCHING BETWEEN POLLING-MODE AND INTERRUPTION-DRIVEN MODES WITHOUT LOSS OF I/O REPLIES

BACKGROUND

The present invention relates to computer systems, and more specifically to switching between polling mode and interruption mode without loss of I/O replies.

I/O to a PCIe plug-in adapter, referred to as a Crypto Express Adapter or Adjunct Processor, is initiated using a specialized machine instruction designed for the specific category of device. It is typical of I/O to these devices to operate asynchronously and to use some form of request and reply queue. Determining whether a reply is ready for dequeuing is performed by polling the device's status. Alternatively, an interrupt handler, particularly a first-level I/O interruption handler, is architected in the CPU whereby the first-level I/O interruption handler receives control and processes the device's interrupt accordingly. Activating of adapter interruptions from polling mode may be asynchronous to the initiating request. The switch over from polling does not occur until it is assured that any future reply will be presented with an interruption. In this way, an unpredictable loss of replies to the adapter's I/O requests is avoided.

It would be advantageous to have the ability to dynamically switch an AP adapter between polling mode and interruption mode without intervention, such as forcing a recovery action to quiesce the system and/or clients using the AP adapter.

SUMMARY

A method is provided for supporting lossless transitions between interruption and polling mode of a resource. In response to a state variable setting or a timed trigger, launching a task to process replies for a resource. The task processes each ready reply for each resource. A timed trigger is established to relaunch the task based on the task executing in polling mode. The task is exited.

Embodiments are further directed to computer systems and computer program products having substantially the same features as the above-described computer-implemented method.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

A computer comprises a plurality of functions and facilities (also referred to herein collectively as "resources"). The resources include software instructions, machine code instructions, microcode and millicode instructions, and physical hardware capabilities, such as one or more Cryptographic Express PCIe (CEX) AP crypto adapters, network adapters, and I/O adapters. While embodiments of the present invention do not depend on virtualization technologies, on computers architected to include a hypervisor, multiple virtual machines may be defined on the computer. The hypervisor exposes a set of the resources to the virtual machines and provides a mechanism for ensuring that operations and modifications of the resources occur in a controlled and predictable manner.

Conceptually, an AP crypto adapter is assigned a unique number, which is its adjunct processor number (APn 0-255). Within each APn there may be assigned up to 256 logically independent processing facilities known as domains. The APn and Domain number pair uniquely identifies an AP crypto resource with which to process work. Each such pair is served by a work queue which may comprise up to 32 elements, with each element containing at most one request message or its corresponding reply message. The numbers of APn, domains, queues, and elements are exemplary, and may vary to include more or fewer, depending on the architectural implementation. Each such queue is known as an AP queue (APQ) and is uniquely identified by the APn and Domain number of the resource it serves. The concatenated AP and Domain numbers may be referred to as the AP queue number (APQN).

The CEX adapter comprises a PCIe interface from which in-bound work is directed to various capabilities present in the adapter. The CEX adapter also includes an FPGA cryptographic chip for high-speed PKU encryption and decryption operations. A processor chip runs a specially customized operating system, preferably Linux, to control the operations of the CEX adapter. Linux applications, known as coprocessor agents, include EP11 (aka XCP) that provides an encryption capability conforming to IBM's implementation of the PCKS #11 programming standard, and the Common Cryptographic Architecture (CCA) agent that provides clear-key and protected key services used by the Linux cryptographic libraries.

The CEX adapter may be configured in one of three mutually exclusive modes, which have no commonality from a programming perspective. Clear-key operations may be performed by CEX adapters configured in CCA or Accelerator mode however EP11 only operates in a secure key mode.

Direct access mode to the FPGA cryptographic chip is provided in Accelerator mode. Requests are issued using a cryptographic request structure appropriate to the architectural implementation. In CCA coprocessor mode, the CCA agent is active and provides the functionality of the CEX adapter. Normal requests are sent using a cryptographic request structure. In EP11 coprocessor mode the EP11 agent is active and provides the functionality of the CEX adapter.

Each AP crypto adapter has one or more queues for transporting AP messages to and from the AP crypto adapter. There are three AP commands to manage the AP messages on the AP queues. The three z/Architecture AP instructions may be implemented in millicode, which is a layer of firmware, because they are both privileged and complex. These are privileged instructions that the operating system (OS) uses to manage the workload of the AP queues. The three z/Architecture AP commands use the APQN to address a specific processing cryptographic resource. Of the three instructions:

NQAP (Enqueue Adjunct Processor) (NQ task) receives the AP command request message from the program storage and places it on the AP queue addressed by a given APQN. An AP command request message may be delivered as a number of segments, each requiring separate NQAP commands. Where multiple segments are needed, the instruction returns the AP queue index or entry number (APEX) on successfully receiving the first segment. Subsequent segments require that the associated APEX be specified with the request. When an entire request message is assembled, the AP crypto adapter is able to process it. Segmenting may occur at the instigation of either the program or the machine. Once the request message is placed on the AP queue, the NQAP command completes, and the request message is processed asynchronously. The AP firmware takes the AP command request message from the AP queue and sends it to the AP crypto adapter. The AP crypto adapter in turn processes the AP command request message and generates the AP command reply message, which it sends to the AP firmware. Status information is returned in the adjunct processor AP queue status word (APQSW) to indicate the status of the resource that was the target of the instruction. That is, the status of the completion of the instruction but not the status of the completion of the request. The AP firmware takes the AP command reply message from the AP and stores it to the AP queue.

PQAP (Process Queue Adjunct Processor) is used in a number of querying and configuration functions relating to individual APQNs, or the entire set of APs and Domains assigned to the program. One such query function is Test AP Queue (TAPQ), which returns configuration and operational status information about the APQN. The TAPQ function also returns whether the associated queue is full or empty and whether the queue is configured for adapter interruptions. This information may be returned in one of the general register operands used. It is also used to delete all the AP messages from the target AP queue using the reset AP queue (RAPQ) or zeroize AP queue (ZAPQ) function. These functions are considered AP crypto adapter administrative services.

Embodiments of the present invention use PQAP to activate and deactivate AP crypto adapter interruptions. The PQAP instruction and the AP-queue interruption control (AQIC) subfunction are provided in a register, such as general register "0." The operand to enable ("1") or disable ("0") and interruption subclass (ISC) are provided in another register, such as general register "1." The ISC identifies an interruption subclass under which interruptions from the AP queue are to be presented. Its use allows for selective enablement/disablement of all or only certain interruption sources, such as individual AP queues. Additional embodiments may use the ISC to selectively enable and disable non AP crypto resources, such as I/O adapters and devices, and network adapters. As architected, the APQSW is returned in general register "1", and includes various status indicators, response codes, and flags, such as an indicator I-bit which indicates whether interruptions are enabled.

DQAP (Dequeue Adjunct Processor) requests that the next ready AP command reply message from the addressed APQN is placed into program storage. After completion of the DQAP, status information is returned in the APQSW to indicate the status of the resource to which the DQAP was directed, i.e., the status of the completion of the DQAP instruction. Once a reply has been successfully removed, the associated queue element of the AP queue becomes free to be used for a subsequent request. An AP command reply message may be returned in multiple segments, requiring a separate DQAP to receive each segment. The first DQAP returns the APEX, which each subsequent DQAP specifies to retrieve the remaining message segments.

With the asynchronous nature of I/O, generally only two methods determine whether a reply message is ready for dequeuing. One method is periodically dispatching a DQAP polling task to poll the APQN message reply queues speculatively to retrieve a reply. An error will be returned when none is available. Alternatively, in an interruption method, the processor CPU architecture specifies a means to nominate a routine (the first-level I/O interruption handler or FLIH) to receive control when a device has a reply ready. The interruption method is generally accompanied with some form interruption code that helps distinguish the device presenting the interruption. This allows the FLIH to direct the interruption to a second-level handler (SLIH) that is designed to deal with interruptions for the specific class of device.

As architected, activating interruption mode is asynchronous. However, it is unknown at what point the processor CPU actually completes the activation. The choice to switch dynamically between activating and deactivating interruption mode is user-driven during the course of system operation. For example, an administrator may wish to switch modes to improve the performance or pacing throughput on one or more adapters. For example, enabling adapter interruptions may reduce latency from request to response delivery. However, that may be disadvantageous if, as a result, the CPU becomes monopolized by work directed to the AP crypto adapters. Disabling adapter interruptions introduces a latency, thereby improving pacing. Similarly, an adapter may require a mode switch as part of an error recovery procedure. In environments without embodiments of the present invention, performing a mode switch may include such administrator intervention as quiescing the system as a whole, quiescing the crypto subsystem, and quiescing any virtual machines or applications that are configured with AP crypto adapters. Additionally, workloads may experience performance degradation during the process.

Traffic may be in process of going to the adapter while the CPU is processing the switch to interruption mode, and it can happen that the OS fails to recognize that replies are pending, thus failing to process the replies in a timely manner. The timing may work out where the interruption mode is enabled and some of the traffic completes after the fact. In that case, the OS can wake up and retrieve the results through the FLIH/SLIH. On the other hand, it can happen that reply messages to the previous request messages become available prior to completion of the enablement. This will result in reply messages pending, but since polling by the DQAP polling task is replaced by the interruption mode, the requestor is not likely to receive the reply messages timely. The possibility of failing to recognize pending reply messages during dynamic enablement is described also in FIG. 2. Timing of the completion of an interruption mode disablement request is not affected because the program reverts to polling mode immediately. Those replies that complete after the mode switch will be captured by DQAP polling.

Figure 1:
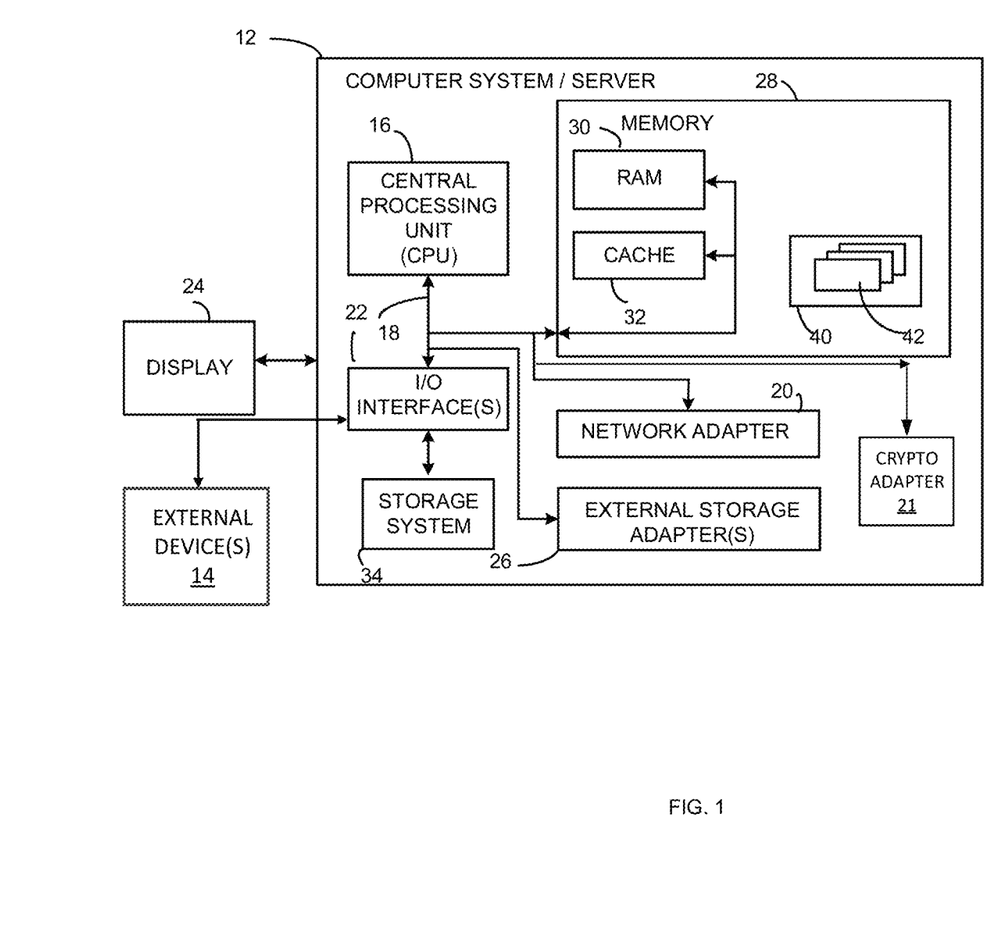
FIG. 1 is a functional block diagram of an illustrative system, according to an embodiment of the present invention.

Referring now to the Figures, FIG. 1 is a functional block diagram of a computer/server 100, according to an embodiment of the invention.

As shown in FIG. 1, the server 12 may include, but is not limited to, one or more processors or processing units 16, a system memory 28, and a bus 18 that couples various system components including system memory 28 to processor 16.

Bus 18 represents one or more of several types of bus structures, including a memory bus or memory controller, a peripheral bus, an accelerated graphics port, and a processor or local bus using any of a variety of bus architectures.

The server 12 typically includes a variety of computer system readable media. Such media may be any available media that is accessible by computer system/server 12, and it includes both volatile and non-volatile media, removable and non-removable media.

The memory 28 can include computer system readable media in the form of volatile memory, such as random access memory (RAM) 30 and/or cache memory 32. The memory 28 may include a hardware system area, which is indirectly accessible and not visible to programs executing on the processor 16. Here, indirectly accessible is used to mean that the hardware system area and the adjunct processor queue(s) stored in the hardware system area are only accessible by specific limited instructions and not otherwise accessible (e.g., cannot load into it, programs are unaware of addresses, etc.). Located within the memory 28 are one or more adjunct processor queues. These queues are not directly visible from user programs and are instead considered a part of the processor 16, memory 28, and adjunct processor(s) (crypto adapter 21).

A processor 16 has access to the queues in memory 28 by, for instance, issuing instructions to place requests on the queue, and/or to remove replies from the queue. The adjunct processor has direct access to the queues via a transport layer and takes requests off the queue, processes the requests, and places replies to the requests on the queue. Therefore, the message flow may comprise the program issuing AP instructions to a queue that is actually in the hardware system area, potentially 256 queues having 32 elements each. The transport layer firmware validates a request and sends the request to the firmware on the crypto adapter 21.

The server 12 may further include other removable/non-removable, volatile/non-volatile computer system storage media. For example, storage system 34 can include a non-removable, non-volatile magnetic media, e.g., a "hard drive" and an optical disk drive for reading from or writing to a removable, non-volatile optical disk such as a CD-ROM, DVD-ROM, or other optical media. Each device in the storage system 34 can be connected to bus 18 by one or more data media interfaces, such as I/O interface 22.

Each program 40 represents one of a plurality of programs that are stored in the storage system 34 and are loaded into the memory 28 for execution. The functions and processes of server 12 may be described in the context of computer system-executable instructions, such as program modules, routines, objects, data structures, and logic, etc. that perform particular tasks or implement particular abstract data types. A program 40 includes an instance of an operating system, an application, a system utility, or similar. Each program 40 includes one or more modules 42.

The server 12 may also communicate with one or more external devices 14 such as a keyboard, a pointing device, and/or any devices (e.g., network card, modem, etc.) that enable the server 12 to communicate with one or more other computing devices. Such communication can occur via Input/Output (I/O) interfaces 22.

In terms of serialization of the adjunct processor queues in the hardware system area, the operating system maintains a representation of the adjunct processor queue in its memory. There is one instance of the operating system data structure per adjunct processor queue. The operating system may obtain an exclusive lock on the data structure before operations are executed against the hardware. This serialization ensures that other processors cannot execute operations against the adjunct processor queue. The operating system maintains its queue count and other status information in this data structure. The operating system may also use the data structure to point to memory copies of messages it has sent to the adjunct processor queue.

Serialization of the CEX adapters at the server hardware level may include the server firmware employing a similar locking mechanism as used at the operating system level. In some implementations, such as the z/Architecture®, multiple levels of millicode and firmware may cooperate to serialize the path from the program to the operating system and to performing real I/O on the PCIe bus.

The management console 24 includes specialized software to communicate with the server 12 through the I/O interface 22 to manage the configuration and state of server 12 hardware. Using the management console 24 an administrator having the appropriate security authorization defines, modifies, and assigns hardware, particularly cryptographic adapters (21), to the server 12. The administrator may also perform an operation to enable or to disable interruption mode on one or more APQNs.

The server 12 can communicate with one or more networks via network adapter 20. As depicted, network adapter 20 communicates with the other components of the server 12 via bus 18. Although not shown, other hardware and/or software components could be used in conjunction with the server 12. Examples include, but are not limited to: microcode, device drivers, redundant processing units, external disk drive arrays, RAID systems, tape drives, and data archival storage systems. In the present invention, the server 12 can illustrate a physical hardware and software implementation.

Figure 2:
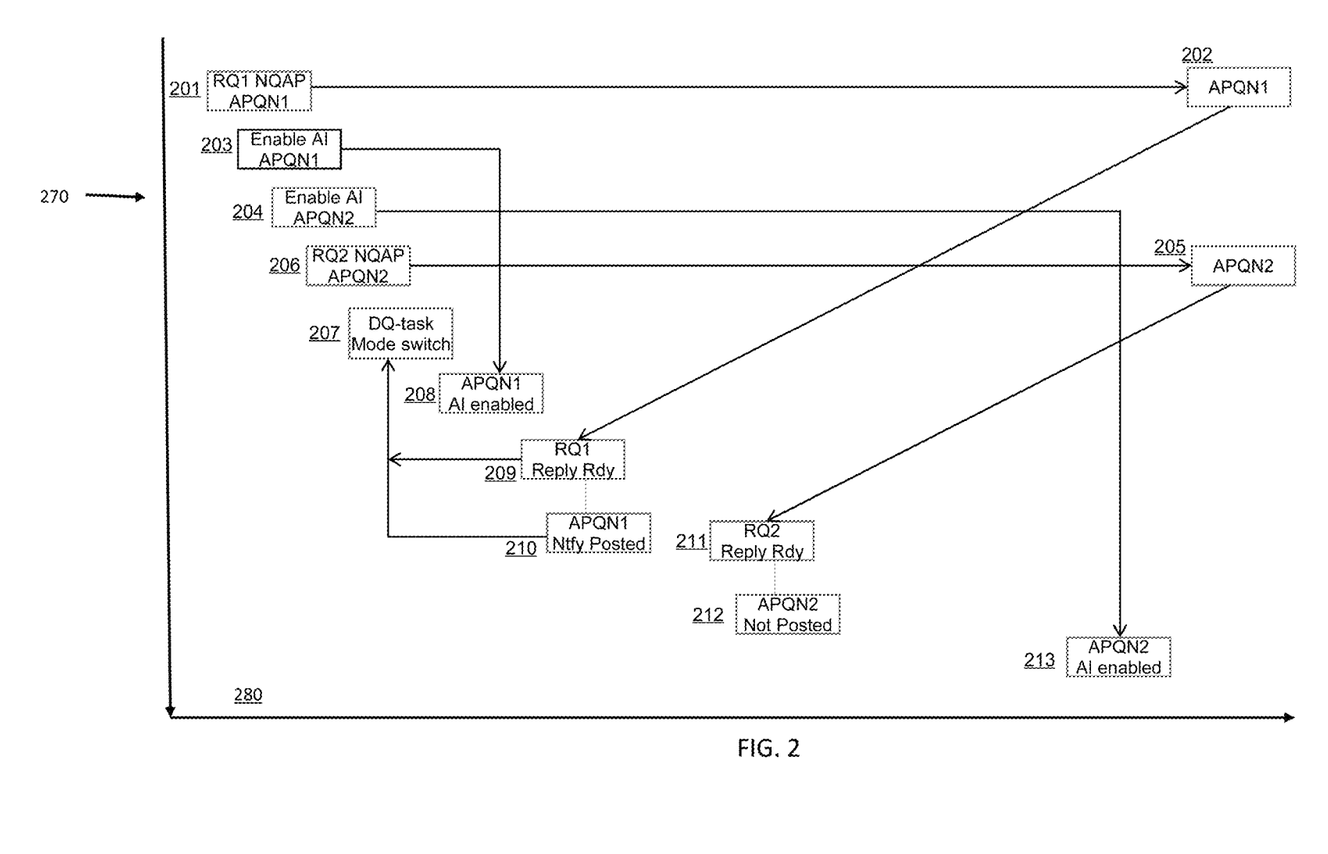
FIG. 2 illustrates a timeline for notification sequencing, according to one or more aspects of the present invention.

Turning now to FIG. 2, the sequence of events 270 along a timeline 280 illustrate the possibility of missing reply messages during dynamic enablement. FIG. 2 depicts a timeline for notification sequencing, according to one or more aspects of the present invention; At 201 the NQAP instruction is issued to queue a request message RQ1 to APQN1 (202). Sometime later, at 209, the reply message to RQ1 is ready. Meanwhile, at 203 the PQAP is issued to APQN1 to switch from polling to enabling interruptions, and at 207 the program switches from polling to interruption mode. If the enablement request completes (208) before the reply message completes (209), then at 210, the notification of pending reply is posted, and interruption handling will recognize and process the reply message.

Contrast this with 204, where the PQAP instruction is issued to APQN2 to switch from polling to enabling interruptions. At 206 the NQAP instruction is issued to queue a request RQ2 to APQN2 (205). At 211, the reply message to RQ2 is ready. However, because the enablement of the interruption mode is not completed until 213, APQN2 does not receive an interrupt notification (212), and the initiative to dequeue the reply message is lost. Although the reply may eventually be discovered due to other activity causing DQAP operations, the response to the requesting application may be delayed indefinitely.

One possible solution is to both poll the resources and rely on the interrupt notifications, but that doubles the overhead and negates the benefit of the interruption mechanism. A trigger task, such as TRIGGER 355 of FIG. 3 may be implemented to address the issue that responses to the requesting application may be delayed indefinitely. Another possible solution is to artificially post the adapter interruption notification for the resource concerned, then launch the DQAP polling task after as suitable delay.

Embodiments of the present invention can be implemented in any distributed computing service that receives requests via some form of network or bus, performs compute-intensive calculations that potentially require a few milliseconds to many minutes to complete. In such a scenario, a timeout strategy is not a reliable mechanism to determine whether an unnotified response is available to retrieve.

Figure 3:
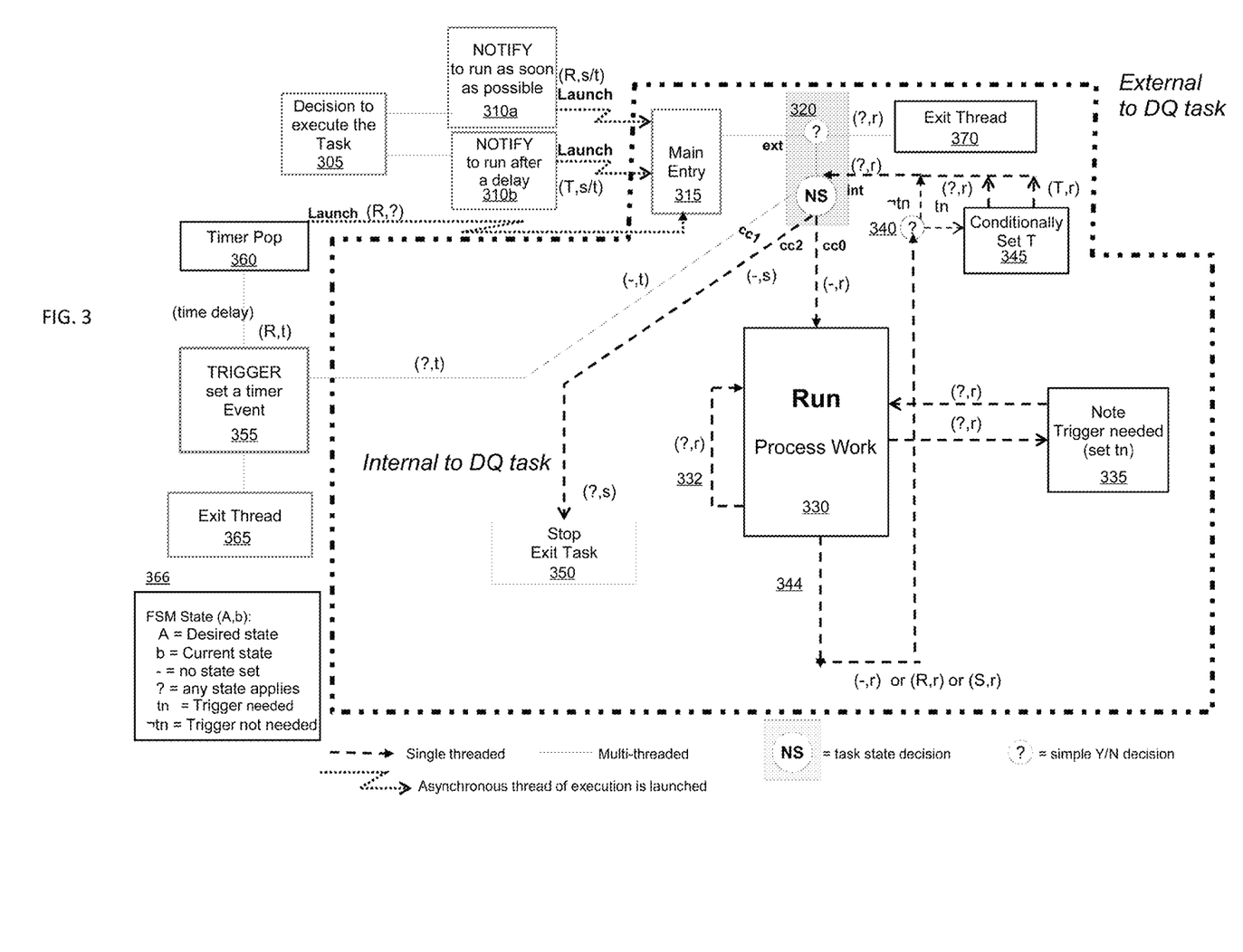
FIG. 3 depicts the operation of the DQ task finite-state-machine.

Other computing constructs, such as networking and I/O, that are based on a request/reply queue structure may avoid the problem of indefinitely delayed responses by architecting a timeout/retry mechanism. Here, data packets are being transmitted and, depending on the health of the computer, incomplete data transmission can occur. For example, data packets can be dropped, misrouted, or delayed. In that case, the remedy is to retry the entire transmission. This is because response time is a measured component of computer performance, with many requests/responses occurring online in real-time. In the network and I/O environments, even when traffic is flowing, a request to change the operating mode of an adapter is relatively unobtrusive to the requestor (i.e., application or operating system). This is because the network and I/O environments architect a concept of a timeout, and the packets within the transmission are small, making it a reasonable remedy to retry the transmission. By comparison, requests in the AP crypto adapter environment are long-running. For example, where a network request/response may transpire in milliseconds, an AP crypto adapter request may take minutes to complete. Further, the AP crypto environment does not have an architected timeout mechanism to advise a requestor that there is a problem with the request, or that a reply is ready. FIG. 3 illustrates a flow for supporting lossless transitions between interruption and polling modes, according to one or more aspects of the present invention. It should be noted that when interruptions are dynamically enabled, the replies are not lost, but what is lost is the initiative to notice the presence of ready replies in a timely manner.

In environments without embodiments of the present invention, the DQAP polling task is periodically dispatched to poll the APQNs for ready requests. To enable dynamic switching between polling mode and interruption mode without the issues discussed in FIG. 2, in FIG. 3, the DQAP polling task (DQ task) becomes a finite state machine.

Using a finite state machine model for the DQAP polling task efficiently creates a notification mechanism, which results in the following outcomes.

The basic operation of the DQ task is to: 1) Launch the task (305) or (360); 2) For each managed resource, process any ready replies (330); and 3) Exit (350) or establish a timed trigger (355) to relaunch the task then exit (365).

Under steady state conditions of interruption enablement, resources will be either enabled or disabled for adapter interruptions and there will be no transitional states. If the DQ task is operating in polling mode, then adapter interruptions are disabled, and the task always relaunches itself via a timed trigger. If the task is operating in interruption-driven mode, then the task is launched on receipt of an adapter interruption and posted notification byte that identifies the cryptographic resource as the source of interruption.

The DQ task operates as a finite-state-machine, with three possible states that describe the task's status with respect to processing work:
Run—the task is running and is committed to processing its work queue.
Stop—the task is not running.
Trigger—the task is committed to arming a timed trigger event to launch the task again after the timer event occurs. The trigger state pertains until the task is re-entered.

There is an associated state variable that records the current state and the desired next state. Access to the state variable (read or write) must be made in an interlocked manner. A compare-and-swap technique is one possibility.

The DQ task is responsible for promoting the desired state to current state. It does this by invoking the next-state selector (320). The launching of a thread of execution of DQ task does not imply a state change. However multiple threads of execution could be initiated. The next-state selector ensures that only one thread of a competing set of threads is successful in promoting the task to the run state.

The next-state selector (NS) performs two functions: 1) It promotes the task's desired state to the current state; and 2) It directs the subsequent execution path for a task thread.

The state variable informs external agents wishing to have work processed by the DQ task how that may be achieved. For example, if the task is already in the run state and an external agent is able to set the desired state of run concurrently, then there is no need to re-launch a thread of execution, because the DQ task always returns (334) to the state selector having completed work for the current run state. If the desired state is Run at this point, then that state will be promoted to the current state, causing the DQ task to process its work queue again. In this case, the thread launched by the external agent exits (370).

If the task is already in the run state, and there is already a desired state of run, then no further action is required to have the DQ task process new work. Again, thread of the external agent exits (370).

If the DQ task is not in the run state, when the desired state is set to run, then the thread of execution launched by the external agent must proceed to drive the DQ task. This relies on the need to assign the work to the DQ task before examining and setting the state variable. An adapter interruption does this by setting the notification byte associated with the crypto resource before it presents the interruption. The interruption drives the setting of the desired state with optional launching of an execution thread (310a).

Execution path direction within the DQ task following a call to the next-state selector is indicated with a code (CCn) returned to the task:
CC0 directs the task to process more work by entering 330;
CC2 directs the task to terminate (350);
CC1 directs the task to establish a trigger event to relaunch the task after a given delay (355). This is done by priming a timed trigger. Having primed the trigger, the task exits (365).

In FIG. 3 the state variable at various points in the processing of the DQ task is shown as an ordered pair (desired state, current state), with the desired state in upper case and the current state in lower case. FIG. 3 also shows where new threads of execution are launched as a result of the execution of the Notify routine (310a, 310b) and the Timer Pop 360.

The Notify routine (310a, 310b) is responsible for ensuring that the DQ task will process a new work item. Essentially the routine notifies the DQ task by updating the desired state and optionally launching a thread of execution to achieve that desired state, as described above. The notify routine imposes an order of precedence when setting the desired state: Trigger state (T) may replace Stop (S); Run (R) may replace both Trigger (T) and Stop (S) states.

The decision to execute the task (305) is typically made following the receipt of an adapter interruption that indicates crypto replies are available. However other reasons may occur to cause the decision at 305 to be made. For example, at system initialization, the DQ task is operating in polling mode and is in the stopped state. When the NQ task sends a request to a crypto resource and receives back an APQSW with the I-bit set to zero, then the NQ task knows adapter interruptions are not enabled. If the DQ task is in the stop state it notifies the DQ task of work but sets the desired state to trigger (310b). This will cause the DQ task to initiate its polling loop via the trigger routine (355) thus allowing the enqueued request a chance to complete. Once the DQ task is launched (in polling mode) it will continue to alternate between run and trigger states without the need for further notifications from the NQ task.

In overview, the launching of a DQ task thread of execution can occur at 360 and 310a, 310b. Indeed, multiple instances of 310a, 310b could occur with or without an instance of 355. To deal with multiple threads of execution entering the DQ task, the next-state selector first arbitrates among those threads allowing only one to succeed to the run path (cc0). This extra processing is required only when a task thread is launched. When the DQ task completes its current processing pass it is single-threaded and returns via 344 to the next-state selector. We use modified entry to the next-state selector labelled int at 320 to bypass the external thread arbitration. External threads enter the longer process at label ext at 320.

In detail, the main processing phase of the DQ task begins at 330.

The RUN process 330 is entered to process replies from zero or more cryptographic resources. The DQ task is said to be in the RUN state when this happens.

Each resource that this task is responsible for is examined to determine whether one or more requests have been sent for processing. If there are no requests, the next resource is examined as indicated by the iteration loop 332. It is also determined whether the resource is enabled for adapter interruptions. If it is not, the DQ task proceeds to speculatively dequeue any ready replies. The task also notes that at least one resource has been encountered for which interruptions are not enabled, and work is in progress by setting the trigger needed (tn) indicator (335).

If adapter interruptions are enabled for this resource, then the DQ task examines the notification byte associated with this resource. If it is non-zero, then replies are ready to be retrieved, and they are dequeued. If it is zero processing continues to the next resource.

Having examined each resource, as described above, processing exits (330) to arrive at the decision point at 340. If there is at least one resource with work in progress that might not generate an interruption (335), as indicated by tn, 345 is entered to set the finite state machine (FSM) (366) desired state to T (trigger) if needed; otherwise, the desired state is left unaltered. Specifically, at 345, if the desired state is R (run) or T (trigger), then it is left unchanged; otherwise, it is set to T (trigger) to ensure that the outstanding work is polled for.

Processing continues to the next-state selector at 320. At this point the current state is run (r) and the desired state could be explicitly set to Run (R), Trigger (T), or Stop (S). The desired state need not be set at all so as to take the default according to the mode of operation of the task. The next-state selector will perform the following operations.

The trigger needed (tn) flag is turned off. This will be set later if needed to force polling for outstanding operations.

If the desired state is set, then the desired state is promoted to the current state, and the desired state is cleared using an interlocked method.

If the desired state is not set, then a default desired state is assumed: Trigger (T) for tasks operating in polling mode or Stop (S) for tasks operating in interruption mode. The current state is then replaced by the assumed desired state and the desired state is cleared.

The next-state selector indicates the path that the DQ task should now follow by setting the code that is returned to the DQ task.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
in response to setting a state variable or a timed trigger, launching a task to process input/output (I/O) replies for a resource;

processing each ready I/O reply for the resource;
arming the timed trigger to relaunch the task based on the task executing in a polling mode of the resource;
dynamically switching between the polling mode and an interruption mode of the resource without loss of the I/O replies based on (i) the state variable having an ordered pair indicating both a desired resource state and a current resource state, and (ii) a setting indicating a state of interruption enablement for the resource; and
exiting the task.

2. The method of claim 1, wherein the resource is at least one of: software instructions, machine code instructions, microcode and millicode instructions, one or more Cryptographic Express PCIe (CEX) adjunct processor (AP) crypto adapters, network adapters, and I/O adapters.

3. The method of claim 1, wherein the task is executing in the polling mode based on the resource having interruptions disabled, and wherein the task relaunches itself via the timed trigger.

4. The method of claim 1, wherein the task executes in an interruption-driven mode based on the resource having interruptions enabled, and wherein the task is launched in response to receiving an interruption from the resource.

5. The method of claim 1, wherein in response to the resource being disabled for interruption, the task speculatively dequeues ready I/O replies, and sets an indicator that work is in progress.

6. The method of claim 1, wherein:
a next-state selector directs an execution path for the task; and
the next-state selector sets the execution path for the task based on a code returned to the task, wherein the code directs the task to continue executing, terminate, or prime the timed trigger to relaunch the task after a given delay.

7. The method of claim 1, wherein:
based on the desired resource state not being set, setting a default desired resource state to either trigger for the task executing in the polling mode, or stop for the task executing in the interruption mode; and
replacing the current resource state with the default desired resource state and clearing the desired resource state.

8. A computer program product comprising one or more computer-readable storage media having program code embodied therewith, the program code executable by a processor of a computer to execute a method comprising:
in response to setting a state variable or a timed trigger, launching a task to process input/output (I/O) replies for a resource;
processing each ready I/O reply for the resource;
arming the timed trigger to relaunch the task based on the task executing in a polling mode of the resource;
dynamically switching between the polling mode and an interruption mode of the resource without loss of the I/O replies based on (i) the state variable having an ordered pair indicating both a desired resource state and a current resource state, and (ii) a setting indicating a state of interruption enablement for the resource; and
exiting the task.

9. The computer program product of claim 8, wherein the resource is at least one of: software instructions, machine code instructions, microcode and millicode instructions, one or more Cryptographic Express PCIe (CEX) adjunct processor (AP) crypto adapters, network adapters, and I/O adapters.

10. The computer program product of claim 8, wherein the task is executing in the polling mode based on the resource having interruptions disabled, and wherein the task relaunches itself via the timed trigger.

11. The computer program product of claim 8, wherein the task executes in an interruption-driven mode based on the resource having interruptions enabled, and wherein the task is launched in response to receiving an interruption from the resource.

12. The computer program product of claim 8, wherein in response to the resource being disabled for interruption, the task speculatively dequeues ready I/O replies, and sets an indicator that work is in progress.

13. The computer program product of claim 8, wherein:
a next-state selector directs an execution path for the task; and
the next-state selector sets the execution path for the task based on a code returned to the task, wherein the code directs the task to continue executing, terminate, or prime the timed trigger to relaunch the task after a given delay.

14. A computer system comprising:
one or more processors;
a memory coupled to at least one of the one or more processors; and
a set of computer program instructions stored in the memory and executed by at least one of the one or more processors to execute actions of:
in response to setting a state variable or a timed trigger, launching a task to process input/output (I/O) replies for a resource;
processing each ready I/Q reply for the resource;
arming the timed trigger to relaunch the task based on the task executing in a polling mode of the resource;
dynamically switching between the polling mode and an interruption mode of the resource without loss of the I/O replies based on (i) the state variable having an ordered pair indicating both a desired resource state and a current resource state, and (ii) a setting indicating a state of interruption enablement for the resource; and
exiting the task.

15. The computer system of claim 14, wherein the resource is at least one of: software instructions, machine code instructions, microcode and millicode instructions, one or more Cryptographic Express PCIe (CEX) adjunct processor (AP) crypto adapters, network adapters, and I/O adapters.

16. The computer system of claim 14, wherein the task is executing in the polling mode based on the resource having interruptions disabled, and wherein the task relaunches itself via the timed trigger.

17. The computer system of claim 14, wherein the task executes in an interruption-driven mode based on the resource having interruptions enabled, and wherein the task is launched in response to receiving an interruption from the resource.

18. The computer system of claim 14, wherein in response to the resource being disabled for interruption, the task speculatively dequeues ready I/O replies, and sets an indicator that work is in progress.

19. The computer system of claim 14, wherein:
a next-state selector directs an execution path for the task; and
the next-state selector sets the execution path for the task based on a code returned to the task, wherein the code directs the task to continue executing, terminate, or prime the timed trigger to relaunch the task after a given delay.

20. The computer system of claim 14, wherein:

based on the desired resource state not being set, setting a default desired resource state to either trigger for the task executing in the polling mode, or stop for the task executing in the interruption mode; and replacing the current resource state with the default desired resource state and clearing the desired resource state.

\* \* \* \* \*